Nov. 20, 1951     T. R. SMITH     2,575,688
FRACTIONATION COLUMN

Filed April 27, 1946     2 SHEETS—SHEET 1

INVENTOR.
Thomas R. Smith
BY
Parkinson & Lane
Attys.

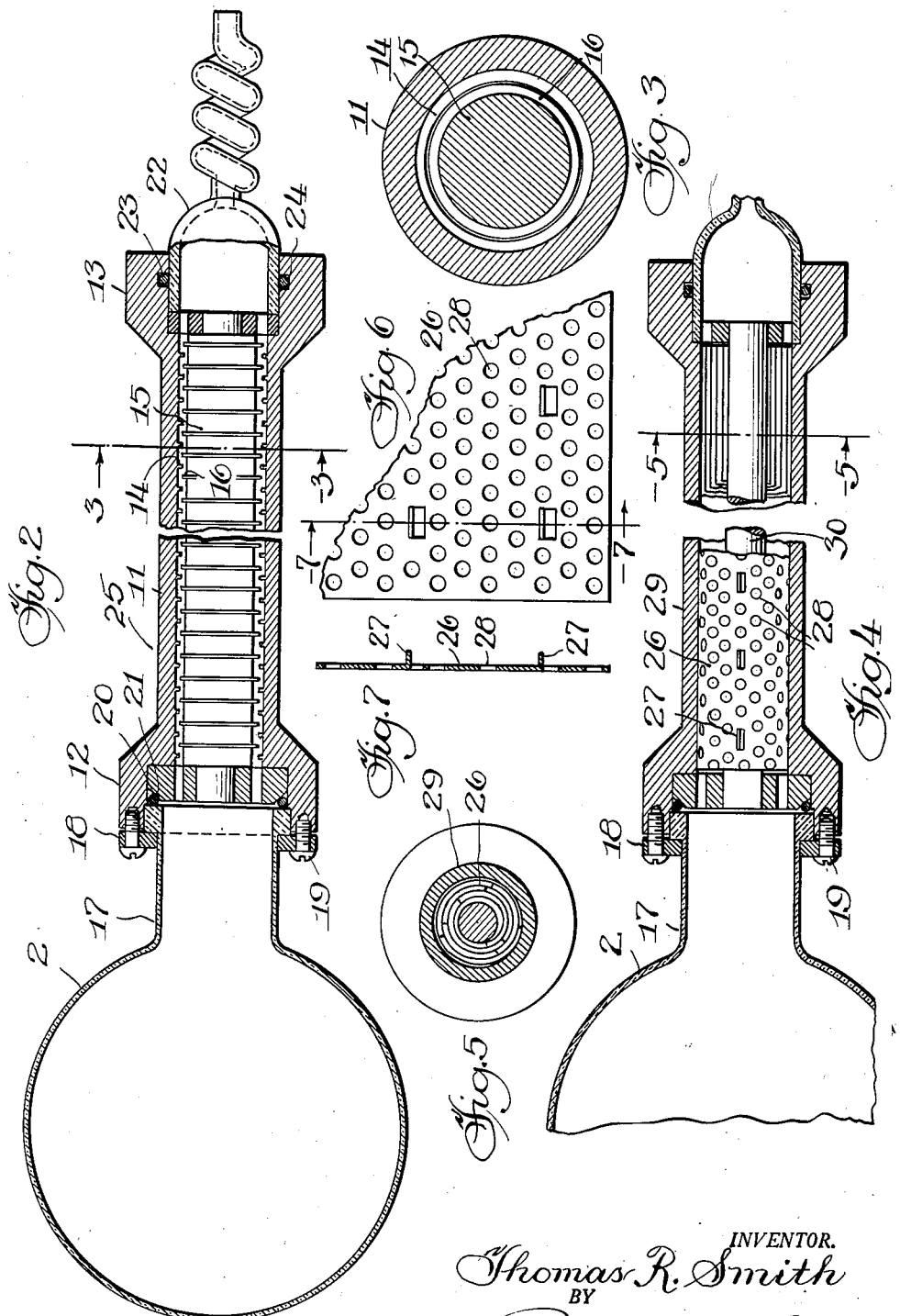

Patented Nov. 20, 1951

2,575,688

UNITED STATES PATENT OFFICE 2,575,688

FRACTIONATION COLUMN

Thomas R. Smith, Newton, Iowa, assignor to The Maytag Company, Newton, Iowa, a corporation of Delaware Application April 27, 1946, Serial No. 665,494

10 Claims. (Cl. 261—83)

The present invention relates to fractionation columns and especially to a novel fractionating column mounted and rotated at a predetermined inclination or angle for securing optimum efficiency.

In the operation of the ordinary type of fractionating column in distilling apparatus, one of the major difficulties encountered is the pressure drop through the column. When it is desired to separate chemicals of slightly different boiling points and especially those which may undergo a chemical change or decomposition at normal boiling points, it is generally desirable or necessary that such distillation be carried out at low pressures and the pressure drop through the column must be taken into consideration. In many instances this normal pressure drop through the column makes it impossible with the present equipment and operation to obtain the low pressure over the surface of the liquid being evaporated and this is especially true when stills are operated at extremely low pressures and where a fine degree of fractionation is desirable. In the latter case, a tall finely packed column is required and this necessitates a relatively large pressure drop through the column.

One of the important advantages of the present invention is to increase the theoretical plate efficiency of a column without increasing the length thereof and without increasing the internal pressure drop.

Of the various types of columns now employed for distillation and fractionation, they may be generally divided into two basic types; namely, the pot type and the continuous type. The present invention is applicable to any type of construction in a fractionating column, and especially to either the pot or continuous type of fractionating columns and with any of the various forms of packings now employed to increase the efficiency, such as stainless steel helices, glass beads, Raschig rings, glass wool, etc.

The present invention comprehends the use of a standard type of fractionating column, but in place of operating it vertically and stationary, tilting or inclining the column at an acute angle with a horizontal plane, and then rotating the column about its longitudinal axis. In the pot type of column, the pot may be secured to and be rotated with the column, although, if desired, the pot may remain stationary and the column rotated.

The invention further comprehends a novel column assembly composed of an inner core and an outer case or housing mounted in concentric relation and with the concentric members provided with fins forming staggered baffles in the annular space between these members.

A further object of the present invention is the provision of a novel packing for a rotary fractionation column mounted at an acute angle with the horizontal. In this novel type of packing, the flow of liquid and refluxing liquid is broken up as they fall by gravity across the axis of the column, and at the same time maintains a rather open arrangement lengthwise or longitudinally of the column, whereby a high efficiency may be obtained with a relatively low pressure drop. In the preferred form, the packing comprises a perforated sheet of material rolled into a spiral configuration with the individual loops or coils suitably spaced apart and maintained in that spaced relation. This spiral formation has a distinct advantage in that when the column is rotated in the proper direction, it will tend to pump the refluxing liquids toward the center of the column.

The present invention further comprehends a novel packing for a fractionating column rotatable in an inclined plane and in which column there is a minimum of obstruction to fluid flow and thereby giving a low pressure drop, but transverse or crosswise of the column and in the direction in which the refluxing liquids will generally flow due to the inclination and rotation of the column in a plane representing an acute angle with the horizontal, there is provided the desired baffling and exposed area resulting in excellent fractionation.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

Fig. 2 is a view in vertical cross-section through a novel fractionation column equipped with a spiral condenser or refluxing tube.

Fig. 3 is a view in vertical cross-section taken on the line 3—3 of Fig. 2.

Fig. 4 is a fragmentary view similar to Fig. 2 but showing a further alternate form of fractionation column.

Fig. 5 is a view in vertical cross-section taken on the line 5—5 of Fig. 4.

Fig. 6 is a fragmentary view in front elevation of a sheet of packing material employed in Figs. 4 and 5.

Fig. 7 is a view in vertical cross-section taken on the line 7—7 of Fig. 6.

Figure 1:
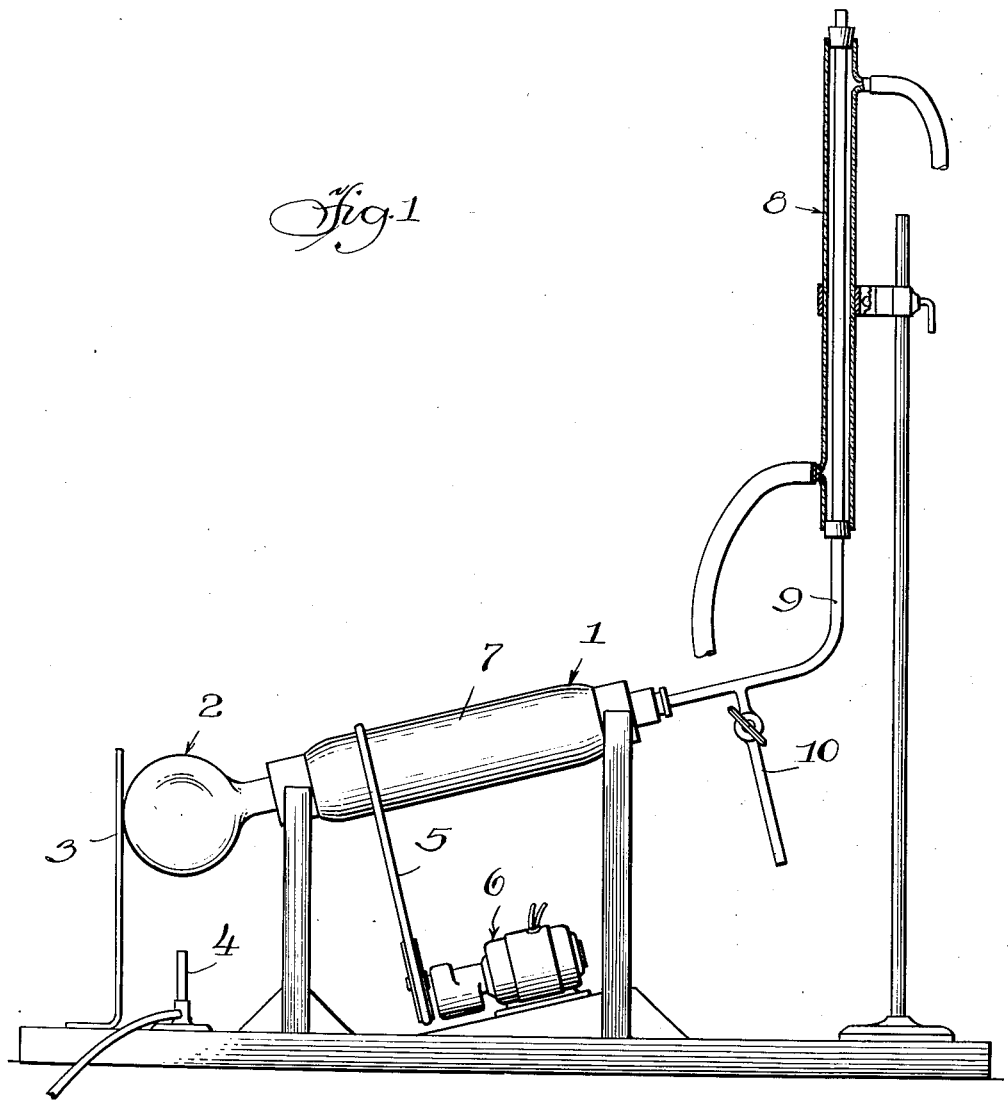
Figure 1 is a diagrammatic view of a distilling apparatus equipped with the novel fractionation column.

In the novel disclosed embodiment, the invention comprehends a fractionation column 1 mounted for rotation in an inclined plane. Mounted at the lower end of the column is a pot or flask 2 adapted to receive the chemicals which may undergo a chemical change or decomposition at normal boiling points. Although there are various types of columns devised for distillation and fractionation for separating chemicals at different boiling points, these may be generally divided into two distinct types, (1) the pot type, and (2) the continuous type. The present invention may be applied to either form or to any other construction in a fractionating column.

In the present invention, a standard form of fractionating column may be employed, and this column may include a desired form of packing such as stainless steel helices, glass beads, Raschig rings, glass, wool, etc., but instead of operating it vertically and stationary, it is so tilted and inclined that the length of the column forms an angle with the horizontal plane and with the column rotating in this inclined plane about its axis. Excellent results have been secured by forming this acute angle at approximately 14° with the horizontal plane.

The pot or flask is preferably mounted to rotate with the column, although for certain purposes the flask or pot may remain stationary and be connected to the column by a rotary seal. One important advantage of rotating the pot is that distillation may be accomplished from a rotary pot without actually boiling or bubbling, and thereby making is possible to distill liquids which have a tendency to foam and bump in the ordinary distillation process. Such advantages are particularly noticeable when a thick viscous material is being distilled.

In the disclosed embodiment, the column 1 is inclined at the desired angle and may be packed with stainless steel helices or other suitable packing. Mounted upon the bottom of the column and rotatable therewith is a flask or receptacle 2 forming the pot for receiving the chemicals to be separated. This flask or pot seats or is disposed adjacent an upstanding bracket 3, which prevents the entire column assembly from sliding out of its bearing supports. Beneath the flask or pot is provided a burner 4 for heating the chemicals. Any suitable means may be provided for rotating the column continuously, the drawings showing one example which includes a belt drive 5 operated at the desired speed through suitable motor and gear reduction apparatus 6 for controlling the speed of the motor. The outside of the column is covered with suitable insulation 7 for preventing heat loss, and the upper end of this column is shown rotatably connected to a condenser 8 by means of a tube or conduit 9. This condenser is adapted to condense the gases coming over the column and to allow for refluxing action.

An outlet 10 is provided between the head of the column and the condenser to permit the taking of samples at intervals or when desired.

The liquid or material to be distilled is placed in the pot and heat is applied by means of the burner. The column and pot are then rotated at a speed which depends upon the viscosity of the liquid being distilled and the diameter of the column, although, as explained above, it may be desirable to merely rotate the column and retain the pot stationary.

In Figs. 2 and 3, there is disclosed a column constructed of two concentric members, the outer tubular member 11 provided with an enlargement or head 12 at one end for connection to the pot or flask 2, and an enlargement or head 13 at its other end for connection to a condenser 8. The outer concentric tube is provided with accurately spaced fins 14 projecting inwardly, and the inner core 15 having spaced fins 16 projecting from the exterior of this core. These fins 14 and 16 are disposed in staggered relation and function as baffles in the annular space between the core 15 and outer concentric tube 11.

In this particular construction and arrangement, the outer diameter of the fins 16 on the inner core 15 is slightly less than the inside diameter of the fins 14 on the outer tube 11 to permit the inner core to be slipped into and out of the tubing for assembly or disassembly. However, if desired, this core could be built of sections and in that event the fins may be of different sizes to provide a most effective labyrinth arrangement in which the outside diameter of the fins 16 may be somewhat greater than the inside diameter of the fins 14 whereby optimum baffling effect will be secured.

As stated above, the column is disposed at an acute angle with respect to the horizontal plane, and with the construction shown in Fig. 2, the pot or flask at the bottom preferably rotates with the column. This is accomplished by connecting the neck 17 of the pot or flask to the enlargement or head 12 of the fractionating column by means of a pressure ring 18 and suitable attaching means, such as screws or the like 19.

Resilient sealing means such as a resilient O-ring 20, may be provided for sealing between the neck of the bottle and the beveled seal seat 21. In the head 13 is provided a refluxing condenser 22 sealed against leakage by means of a resilient or flexible O-ring seal 23 disposed within an annular channel 24 in the inner circumference of the head 13. This condenser tube has a spiral twist in it in order that as the entire unit rotates this spiral will pump the condensate back into the head of the column and thereby giving continuous reflux.

After the column has attained equilibrium, rotation may be stopped and reversed slightly in order to pump out a sample for test through the spiral condenser tube. This refluxing condenser is primarily adapted for theoretical testing purposes only, and for other purposes a stationary condenser of the type shown in Fig. 1 is preferably provided. Where a stationary condenser is employed, a rotary seal is provided to permit relative rotation between the column and condenser. As in Fig. 1, the column is completely insulated at 25 and such insulation normally extends to the heads 12 and 13.

In larger size columns it may be desirable to connect the pot to the base of the column with a rotary seal also, so that only the column portion rotates. In medium size stills there is an advantage in rotating the pot along with the column for the reason that excessive boiling and bumping are eliminated and smoother action is obtained.

In Figs. 4 to 7, inclusive, there is shown a novel form of packing for the fractionating column. This new packing is designed to reduce the pressure drop to a lower value than can be obtained with the ordinary type of packing, such as glass beads, Raschig rings, stainless steel helices, glass wool, etc. By reason of this novel construction, the effective length of the column is also increased due to the fact that the refluxing liquids are being continually carried to the top side of the column and by gravity fall sidewise through the column rather than straight down the axis of the column as is the case where the prior types have been employed.

This new construction comprises a perforated sheet of material 26 shown in Figs. 6 and 7, provided with spacing means such as tongues 27 and closely compacted openings or perforations 28. This perforated sheet of material is rolled up into a roll, and with the tongues providing spacing rings to keep the layers separated is mounted within the case or housing 29 about a central core 30. As this rolling up of the flat material forms a spiral, which tends to pump the refluxing liquids, it is desirable to roll the sheet in such a direction that the rotation of the column will tend to pump the liquids toward the center rather than force them to the outside. If the pumping of the refluxing liquids toward the center is not desired or required, the packing may be formed of concentric tubular members provided with spacing means for keeping them in their proper spaced relation, and in that event the column may be rotated in either direction. Or, the spiral roll may be formed of ordinary mesh or screen wire, either with or without the employment of spacing means between individual coils, and if compactly rolled the center core may be eliminated.

From the above description and the disclosure in the drawings, it will be readily apparent that the invention comprehends a novel construction and arrangement of fractionation and that excellent results have been obtained by inclining the fractionation column at an acute angle with the horizontal and by rotating that column whereby a fine degree of fractionation is secured. The pot may be rotated or not depending upon the liquid being distilled, but it has been found that where a relatively thick viscous liquid is distilled, rotation of the pot eliminates actual boiling or bubbling thereby making it possible to effectively and easily distill liquids which have a tendency to foam and bump in the ordinary distillation process.

It will further be apparent that the invention comprehends a novel construction and arrangement of inclined fractionating column and in a novel unidirectional packing for such an inclined column.

Having thus disclosed my invention, I claim:

1. In a fractionating column, concentric members forming an annular space therebetween, and spaced baffles provided on the adjacent surfaces of said members with the baffles disposed in staggered relation, means for mounting and rotatably operating said column at an acute angle with the horizontal, and a receptacle for liquid to be treated carried by the lower end of the column and rotatable therewith.

2. A rotatable fractionating column mounted and operated in an inclined position and comprising a pair of concentric members having spaced fins disposed on the adjacent circumferential surfaces of said members and projecting into the annular space therebetween with the fins on one member disposed in staggered, spaced relation with those on the other member, and a receptacle for liquid to be treated carried by the lower end of the column and rotatable therewith.

3. A fractionating column mounted for rotation in an inclined position and rotatable about its longitudinal axis, comprising an inner core and an outer casing mounted in concentric relation to provide an annular space therebetween, uniformly spaced annular baffles provided on the inner circumference of the casing and the outer circumference of the core and with the baffles arranged in staggered relation, and a receptacle for liquid to be treated carried by the lower end of the column and rotatable therewith.

4. A fractionating column mounted for rotation about its longitudinal axis and tilted at an acute angle with the horizontal, comprising a pair of elongated concentric members mounted in spaced relation to provide an annular space therebetween, spaced fins provided on the exterior of the inner member and interior of the outer member and projecting into said annular space in staggered relation to provide uniform baffling, and a receptacle for liquid to be treated carried by the lower end of the column and rotatable therewith.

5. In a fractionating column mounted for rotation at an upward inclination and acute angle with the horizontal, an elongated tubular casing and a packing therefor comprising a spirally wound sheet of perforated metal and spacing means for maintaining the individual coils separated, a receptacle for the liquid to be distilled having its open end connected to the lower end of the column, and means for rotating the column and receptacle as a unit.

6. In a rotatable fractionating column adapted to be mounted and operated at an upward inclination, an elongated tubular casing rotatable about its longitudinal axis, a packing in and extending continuously for substantially the length of the column and abutting the interior thereof, said packing consisting of spaced layers of perforated sheet material and means maintaining the layers in spaced relation to provide relatively little obstruction to fluid flow longitudinally, but providing relatively large baffling and exposed area transverse of the column for optimum fractionation, and a receptacle for the liquid to be treated secured to the lower end of the column.

7. In a fractionation column inclined upwardly at an acute angle with the horizontal, a packing mounted in the interior of and extending continuously for approximately the length of the column and comprising a perforated sheet of material spirally wound into a roll with the adjacent layers provided with projections maintaining these layers spaced apart to permit substantially unobstructed fluid flow lengthwise of the column and packing, means for rotating the column whereby the spirally wound roll tends to pump the fluid toward the center of the column, and a receptacle connected to the lower end of the column for receiving the liquid to be treated.

8. In distilling apparatus, the combination of a rotatable and upwardly inclined fractionating column comprising a casing and a packing in said casing and rotatable therewith, means for mounting said column in its inclined position for rotation about its longitudinal axis, a rotatable receptacle for the liquid to be treated secured to the lower end of the column and in direct communication with said packing, and means for rotating the receptacle and column about the longitudinal axis as a unit for uniformly distributing the liquid in said column.

9. In distilling apparatus, the combination of a rotatable and upwardly inclined fractionating column comprising an elongated casing with a packing secured therein and rotatable therewith, means for supporting said column in its inclined position for rotation about its longitudinal axis, a rotatable receptacle connected to and carried by the lower portion of said column for receiving the liquid to be treated, said receptacle being closed except for an opening in communication with said packing, means for heating said receptacle, and means for rotating the receptacle and column about the longitudinal axis to distribute the liquid in said column and for uniformly heating the liquid in said receptacle.

10. In distilling apparatus, the combination of a rotatable and upwardly inclined fractionating column comprising a casing containing a packing secured thereto and rotatable therewith, means for supporting said column in its inclined position for rotation about its longitudinal axis, a receptacle for receiving liquid to be treated having a single opening connected to the lower end of said column and in direct communication with said packing, means for heating said receptacle, and means for rotating said receptacle and column about the longitudinal axis to evenly distribute the liquid in said column and for agitating and uniformly heating the liquid in said receptacle.

THOMAS R. SMITH.

REFERENCES CITED

The following references are of record in the file of this patent:

UNITED STATES PATENTS

| Number | Name | Date |
| --- | --- | --- |
| 1,231,695 | Bell | July 3, 1917 |
| 1,650,140 | Kuhni | Nov. 22, 1927 |
| 1,817,665 | Bailey | Aug. 4, 1931 |
| 2,044,996 | Podbielniak | June 23, 1936 |
| 2,133,819 | Howse et al. | Oct. 18, 1938 |
| 2,317,101 | Lecky | Apr. 20, 1943 |
| 2,317,951 | Burk | Apr. 27, 1943 |
| 2,333,712 | Eckey | Nov. 9, 1943 |
| 2,394,293 | Deem | Feb. 5, 1946 |
| 2,404,789 | Burk et al. | July 30, 1946 |

FOREIGN PATENTS

| Number | Country | Date |
| --- | --- | --- |
| 348,244 | Great Britain | May 14, 1931 |
| 499,433 | Germany | June 7, 1930 |